United States Patent Office 2,799,594
Patented July 16, 1957

2,799,594

PHTHALOCYANINE PIGMENTS

Felix Frederick Ehrich, Westfield, N. J., assignor to E. I. du Pont de Nemours and Company, Wilmington, Del., a corporation of Delaware No Drawing. Application November 12, 1953, Serial No. 391,729

4 Claims. (Cl. 106—288)

This invention relates to new phthalocyanine pigments, processes for preparing them, and coating compositions containing the same. More particularly it relates to the production of phthalocyanine pigments which are resistant to flocculation when dispersed in an organic coating composition.

Phthalocyanine pigments are well known for their outstanding tinctorial strength and resistance to light and chemical agents. Such pigments are also known to have a serious defect commonly referred to as flocculation, a characteristic evidenced by an apparent aggregation of pigment particles during setting and drying of organic coating compositions containing the same, resulting in marked reduction of color strength. What actually happens in the paint film and whether the word "flocculation" is correctly used to describe it are subjects which have been disputed. The important point, however, is that the enamel, paint or lacquer when standing in a quiescent state exhibits a different color than when it is being vigorously agitated and, therefore, can not be depended upon to give reproducible color in actual use under a variety of conditions of application.

The reversibility of the phenomenon may, moreover, be used as a test for "flocculation." One may, for instance, make a typical enamel containing about 10 parts of phthalocyanine and 90 parts of $TiO_2$ dispersed in an oil-modified alkyd resin and this enamel may be applied to a test panel by spraying in the conventional manner. When the film has become tacky, usually in three to five minutes, a portion of the panel is rubbed with a soft cloth or with the finger. A difference in color of the rubbed portion as compared to the undisturbed film is considered evidence of flocculation. With untreated prior art phthalocyanines this rubbed portion of the film appears darker or stronger than the unrubbed portion. This test might be considered typical of the behaviour of a brushing enamel which shows serious brush marks when a partially dried portion is brushed over as in joining with a previously brushed portion.

Another test more particularly applicable to compositions which dry very rapidly and largely by evaporation of the solvent, such as a typical nitrocellulose lacquer, but also applicable to enamels especially those formulated for application by dipping involves spraying a test panel and allowing it to dry, after which a portion of the same composition which has been standing undisturbed is poured over the test panel and allowed to drain freely. Again, a difference in color is evidence of "flocculation" and with the typical prior art phthalocyanine the poured portion appears light or weak vs. the sprayed portion. This test illustrates the problem encountered in attempting to match the color of a dipped auto fender, for instance, with that of the sprayed auto body.

Numerous attempts have been made to eliminate the defect of flocculation of phthalocyanine pigments, for example, the addition of aluminum benzoate or phthalocyanine monosulfonic acid to the phthalocyanine pigments subject to flocculation.

It is well known that pure copper phthalocyanine pigments exhibit a pronounced tendency to grow crystals in many hydrocarbon solvents, particularly those of an aromatic nature, with consequent loss of tinctorial strength. To obviate this defect, it is also well known to introduce small amounts of chlorine, usually about 3%–5%, which is appreciably less than one atom of chlorine per molecule of phthalocyanine. Such chlorine-containing pigments are not significantly altered in shade and are substantially free from the tendency to grow crystals in solvents. Chlorine is also sometimes introduced in larger amounts to alter the hue toward green. Throughout the specification and claims reference to copper phthalocyanine is intended to include chlorine-containing copper phthalocyanine.

It is an object of this invention to produce phthalocyanine pigments which are highly resistant to flocculation in organic vehicle coating compositions. It is another object of this invention to provide an improved process for the production of phthalocyanine pigments. It is still another object of the invention to produce improved coating compositions containing these new and improved phthalocyanine pigments. Other objects of the invention will appear hereinafter.

The objects of this invention are attained by preparing new phthalocyanine pigments through the use, in the well-known phthalic anhydride-urea synthesis, of mixtures of a minor amount of 4-sulfophthalic anhydride or 4-sulfophthalic acid under such conditions that not exceeding about 15% of the molecules of the phthalocyanine can contain the polar sulfonic group.

The new pigments of this invention are highly resistant to flocculation in organic coating compositions; they exhibit the tinctorial properties of the unmodified phthalocyanine pigments with a very minor effect from the addition of the sulfonic acid group; and they exhibit the excellent light-fastness and resistance to chemical attack characteristic of phthalocyanine pigments.

In accordance with one illustrative embodiment of this invention, 1.25 mol percent of 4-sulfophthalic acid, or 4-sulfophthalic anhydride, is added to 98.75 mol percent of phthalic anhydride and the mixture used with appropriate amounts of urea cupric chloride, and, as a catalyst, ammonium molybdate in a conventional phthalocyanine synthesis conducted in a diluent medium such as kerosene.

The following examples illustrate in detail several processes for the production of the new pigments and coating compositions of this invention.

*Example I*

The following ingredients are charged to a well-agitated reactor equipped with an air-cooled reflux condenser and arranged for external heating:

| | |
|---|---|
| Pthalic anhydride | grams 121 |
| 4-chloro phthalic acid | do 34 |
| 4-sulfo phthalic acid | do 3.1 |
| Cupric chloride dihydrate | do 44 |
| Urea | do 222 |
| Ammonium molybdate | do 0.3 |
| Deodorized kerosene | ml 800 |

The mixture is heated with good agitation to 195° C. over a period of two and one-half to three hours and held at 195° C.–200° C. for about four hours. It is then cooled to 150° C. at which point 90 ml. of 98% $H_2SO_4$ is added dropwise. The resulting solid is filtered from the kerosene and added to 4000 ml. of water containing 200 grams of NaOH. The slurry is heated to the boil, filtered hot, washed free of soluble salts and dried at about 150° C.

The resulting crude copper phthalocyanine pigment, which contains about 5 mol percent of 4-mono-sulfo copper phthalocyanine and about 65 mol percent of 4-monochloro copper phthalocyanine, is preferably conditioned for use by means of the milling methods of Lane and Stratton U. S. Patent No. 2,556,727. For instance, 65 grams of the crude pigment and 500 ml. of acetone are charged to a ball mill of about ⅔ gallon total capacity containing about 4800 gms. of ⅛ inch steel shot and the mill is rotated for about three days. The slurry of pigment in acetone is then separated from the steel shot, the acetone removed by steam distillation, and the resulting aqueous slurry extracted with dilute sulfuric acid, e. g., 4-5%. It is then filtered, washed free of soluble salts and may be dried and pulverized to give a blue copper phthalocyanine pigment which is highly resistant to flocculation when dispersed in a coating composition vehicle. It is also crystal stable in such compositions.

Although markedly improved in ease of dispersion when compared to previously known phthalocyanine pigments, the product of this example still requires considerable work for complete dispersion in the vehicle and such dispersion is preferably accomplished in a ball mill. It may also be effectively accomplished by flushing the aqueous paste prior to drying into a suitable vehicle.

*Example II*

This is like Example I except for an increase in the 4-sulfo phthalic acid to give a product containing about 10 mol percent of 4-mono sulfo copper phthalocyanine, 64 mol percent of 4-mono chloro copper phthalocyanine, and 26 mol percent of unsubstituted copper phthalocyanine. The following ingredients were used in the basic process of Example I.

| | |
|---|---|
| Pthalic anhydride_____grams__ | 121 |
| 4-chlor phthalic acid_____do____ | 32 |
| 4-sulfo phthalic acid_____do____ | 6.2 |
| Cupric chloride dihydrate_____do____ | 44 |
| Urea _____do____ | 222 |
| Ammonium molybdate_____do____ | 0.3 |
| Deodorized kerosene_____ml__ | 800 |

The crude pigment may be finished by milling in organic liquids as described in the previous example to give a highly desirable flocculation-resistant and crystal-stable copper phthalocyanine.

*Example III*

In order to obtain products of superior dispersion in coating composition vehicles, the well-known resination process of Siegel U. S. Patent No. 2,173,699 may be advantageously employed. For instance, 375 parts of a 20% (solids basis) copper phthalocyanine paste (75 grams dry basis) obtained as in Example I by omitting the final drying step is diluted with about 375 ml. water and mixed with a rosin soap solution, prepared by boiling together a mixture of 25 grams K wood rosin, 3.2 parts of 100% NaOH and 310 parts of water until a clear solution results. The color paste-rosin soap mixture is vigorously stirred and then an aqueous solution of 12 parts barium chloride ($BaCl_2 \cdot 2H_2O$) is run in slowly. The slurry is stirred vigorously for one-half hour, filtered, washed until chloride-free, dried, and pulverized to give a very soft blue lake of about 75% copper phthalocyanine which exhibits all of the flocculation resistance of the original toner and, in addition, is very easily dispersed in desired vehicles.

As has been suggested above, the application of vigorous work as in a ball mill will often disperse very hard pigments in a paint vehicle. However, modern paint technology is turning to less vigorous methods of dispersion with the consequent greater demand on the pigment. Such a method, for instance, is the use of the well-known multiple roller mill for dispersion of the pigment in the vehicle. With such a mill a pigment which is poor in dispersion may show a deficiency in any one or more of three characteristics, which are readily observed and which materially affect the economic use of the product. The first of these is a tendency for the pigment and the vehicle to separate on the mill so that the vehicle tends to pass through the mill first and leave a relatively dry pigment toward the end of the cycle. This makes for non-uniformity in the product, requiring additional mixing and also causes unusual stresses on the mill. The second criterion of good dispersion is the freedom from grit or unground pigment, which can cause streaking under a brush or other defects in the final film; the third criterion is the rate of development of color strength on successive passes over the mill.

On all three points, the lake of this Example III shows excellent properties. It is free from separation, substantially all visible grit is eliminated after three passes over the mill, and the same three passes develop substantially all the available color strength as judged by the strength developed in a vigorous ball mill dispersion. On the contrary, many previously-known products are unusable in roller mill dispersion techniques because of serious failure in all three points. The product of Example I though markedly superior to such previously-known products is still deficient in all three points; hence, the lake of this Example III is one method of overcoming these defects.

*Example IV*

The crude product of Example I, instead of milling in acetone, may be finished by the following procedure to give a strong pigment of vastly superior texture. Sixty-five (65) grams of the crude pigment and 500 ml. of carbon tetrachloride are charged to a ball mill of ⅔ gallon total capacity containing 4800 grams of ⅛ inch steel shot and the mill is rotated for 48 hours. The ground pigment slurry is separated from the steel shot and the carbon tetrachloride is removed by steam distillation which is facilitated by vigorous agitation. The resulting aqueous slurry is then boiled with dilute acid, filtered, washed free of soluble salts, dried, and pulverized to give a copper phthalocyanine pigment free of any extender which exhibits excellent dispersion in coating composition vehicles when judged by the three criteria discussed under Example III.

Instead of carbon tetrachloride, one may use trichlorethylene, tetrachlorethylene, ortho-dichlorbenzene, trichlorbenzene, and the like. The relatively low boiling halogenated hydrocarbons have the advantage of freedom from fire hazards and ease of removal. All such water-immiscible solvents, however, compare unfavorably with water-soluble acetone as regards ease of removal; but the advantages in texture offset this disadvantage. The milling of the pigments of this invention in chlorinated hydrocarbons, particularly carbon tetrachloride, is claimed in the copending application of Stanley F. Kudzin, Serial No. 391,741, filed November 12, 1953.

*Example V*

The following ingredients are charged to a well agitated reactor equipped with an air-cooled reflux condenser and arranged for external heating:

| | |
|---|---|
| Phthalic anhydride_____grams__ | 146 |
| 4-sulfo phthalic anhydride_____do____ | 2.9 |
| Urea _____do____ | 222 |
| Cupric chloride dihydrate_____do____ | 444 |
| Ammonium molybdate_____do____ | 0.3 |
| Deodorized kerosene_____ml__ | 800 |

The mixture is heated with good agitation to 195° C. over a period of two and one-half to three hours and held at 195°–200° C. for four hours. It is then cooled to 150° C., at which point 90 ml. of 98% $H_2SO_4$ is added dropwise. The resulting solid is filtered from the kerosene and added to 4000 ml. of water containing 200 grams of NaOH. The slurry is heated to the boil, filtered hot, washed free of soluble salts, and dried at 150° C.

The resulting crude pigment which contains about 5 mol percent of 4-monosulfo copper phthalocyanine is conditioned for use as a pigment following the procedure of Lane U. S. Patent No. 2,556,726 in which the pigment is ground in a ball mill in acetone substantially as described in Example I. The resulting product is a high strength copper phthalocyanine pigment of a relatively green shade typical of the beta crystal phase of copper phthalocyanine (see above cited Lane patent) and which is both crystal-stable and flocculation-resistant in paint and enamel vehicles.

Contrary to some of the implications in the prior art, it is now observed that the amount of sulfonated phthalocyanine which is present in the final pigment profoundly influences its behaviour in accomplishing the objectives of this invention. When such species are present in amounts below about 2 mol percent, the effect is so small as to be hardly noticeable and the pigment does not show an acceptable resistance to "flocculation" in any vehicle system. As the amount of the sulfonated species increases the effect becomes more pronounced and, in the range between about 5 mol percent and 10 mol percent (1.25 to 2.5 mol percent of 4-sulfo phthalic acid in the cosynthesis) a definite optimum is reached which may vary somewhat for different vehicle systems. The use of amounts over about 15% is generally considered uneconomical. Moreover, we have been quite surprised to discover that coating compositions made from such products containing over about 10% of the sulfonated species exhibit an undesirable effect substantially the reverse of the usual "flocculation" in that the quiescent enamel is actually stronger than the same enamel after vigorous agitation. Such a phenomenon may be called "flooding," in contrast to the more common "flocculation." Regardless of the nomenclature the two phenomena appear, however, to be closely related in that both are probably a result of a separation in some manner of the two pigments in a paint system comprising a mixture of a phthalocyanine and a second prime pigment, such as TiO₂, dispersed together in a vehicle, and from the standpoint of the practical application, they are equally objectionable. It is well known that the tendency of a phthalocyanine pigment to "flocculate" varies markedly with the vehicles used as well as with the solvents in these vehicles and it is possible to exercise limited control over this property by the proper selection of vehicles and thinners and by the use of "anti-flooding" agents and the like. Such means of control, however, are only moderately effective and, moreover, restrict the choice of vehicles. Now, we find that, by means of the proper balance of pigments which show a tendency to "flood" with pigments which flocculate, it is possible to obtain in a chosen vehicle a composition which shows no color change on vigorous agitation.

Hence, the ability to make a pigment which shows some tendency to "flood" as defined herein is actually an advantage in the over-all control of "flocculation," and we contemplate this invention as including the range of compositions containing from about 2 mol percent to about 15 mol percent of the sulfonated species. This mol percentage range in the final composition is equivalent to 0.5 to 3.75 mol percent of 4-sulfo-phthalic acid or 4-sulfophthalic anhydride and 96.25 to 99.5 mol percent of phthalic anhydride in the cosynthesis. This does not mean that pigments containing more than 15 mol percent of the sulfonated species would lack utility, because they can be formulated into satisfactory products using the technique of balancing properties of pigments noted above. Nevertheless, it is the objective of this invention to make products showing the least possible flocculation and such products containing more than 15 mol percent of sulfonated phthalocyanine do not meet this objective.

Moreover, the position of the sulfonic acid group in the molecule is an important consideration. It is known that the direct sulfonation of copper phthalocyanine results in substitution in the 3-position (see U. S. Patent No. 2,285,359). On the other hand the use of 4-sulfo phthalic acid fixes the substitution in the 4-position in the final molecule and confers more effective flocculation resistance on the composition.

The conditions of synthesis such as temperature, rate of heating, amount of urea, amount of catalyst, and the like are in no ways different than in the conventional commercial manufacture of copper phthalocyanine. The examples have shown the synthesis conducted in the presence of a deodorized kerosene as the liquid diluent. However, when deodorized kerosene or other high-boiling hydrocarbons are used for this purpose, it is, of course, desirable that they be substantially free from oxidation products, such as peroxides, which may result from prolonged exposure of the hydrocarbons to the atmosphere, since such impurities frequently function in some unexplained manner to inhibit the formation of phthalocyanines in this reaction. Moreover, other diluents previously used for this purpose can be used as, for instance, trichlorbenzene, orthodichlorbenzene, nitrobenzene, and the like. In fact, the liquid diluent may be omitted altogether since its presence does not seem to affect the course of the phthalocyanine synthesis in any major way beyond maintaining the material in suspension and preventing the severe caking usually found in the absence of such diluents. It also functions as an efficient heat transfer medium.

The products may be separated from the liquid diluent in a variety of ways. For instance, the examples show the use of the methods proposed by Barnhart in U. S. Patent No. 2,602,800, in which the phthalocyanine is converted to sulfate and separated from the major portion of the diluent after which the sulfate is hydrolyzed and the remainder of the diluent removed in the drier. On the other hand, the diluent may be removed directly by steam distillation or the major portion removed by filtration followed by steam distillation.

In common with other phthalocyanine pigments the products of this invention exhibit a relatively large particle size and require conditioning by reduction of the particle size for most uses. The preferred method shown in the examples is the milling method of Lane and Stratton U. S. Patent No. 2,556,727 or, when applied to the chlorine-free product, of Lane U. S. Patent No. 2,556,726. For the products containing chlorine which has been introduced to lend crystal stability to the product, the salt milling methods of Lang and Detrich U. S. Patent No. 2,402,107, or the conventional acid pasting (solution in concentrated sulfuric acid followed by dilution to precipitate the finely-divided pigment) are equally effective in reducing particle size and developing pigment strength. However, for reasons not presently understood, the pigments finished by acid pasting suffer in their flocculation resistance.

On the other hand, chlorine-free copper phthalocyanine is profoundly affected by its method of finishing. The solvent milling method of Lane as shown in Example 5 gives the desirable crystal-stable, greenish-blue copper phthalocyanine of beta crystal phase. Similar results are obtained by salt milling in the presence of crystallizing solvents as shown by Graham in U. S. Patent No. 2,556,728 and U. S. Patent No. 2,556,730. However, if this chlorine-free product is finished by acid pasting or simple salt milling, it reverts to the alpha crystal phase which is a relatively red shade of blue but which is not crystal-stable in solvents and hence of little use in most paint and enamel compositions. Nevertheless, it does exhibit flocculation resistance in comparison to products containing no sulfonic acid groups.

This invention is contemplated as applicable also to products containing still higher amounts of chlorine which have been introduced to alter the hue toward the green, as in polychloro copper phthalocyanine. Furthermore, although it has been shown only in connection with copper phthalocyanine, it is contemplated as equally applicable to other metal phthalocyanines, particularly nickel, cobalt, aluminum, and iron phthalocyanines as well as to metal-free phthalocyanine.

The reasons why the pigments of this invention are superior to the prior art pigments in resistance to flocculation are not fully understood. Many of the properties of a paint, enamel, lacquer or similar system can be explained on the assumption that such a system of finely-divided solid suspended in a vehicle is a lyophilic colloidal sol. The stability of such a sol is related to the charge on the particles of the dispersed phase, and it is suggested that the introduction of polar groups into the phthalocyanine molecule increases this charge and promotes stability in the system. It is still not understood why the maximum stability is found in the presence of only a limited amount of polar molecules.

The products of this invention are valuable in all uses to which phthalocyanine pigments are commonly put. However, they are especially valuable in the pigmentation of paints and enamels where the flocculation of the previously-known phthalocyanines has been especially bad.

Throughout the specification and claims, any reference to parts, proportions and percentages refers to parts, proportions and percentages by weight unless otherwise specified.

Since it is obvious that many changes and modifications can be made in the above-described details without departing from the nature and spirit of the invention, it is to be understood that the invention is not to be limited to said details except as set forth in the appended claims.

I claim:

1. A phthalocyanine pigment highly resistant to flocculation in an organic coating vehicle comprising a cosynthesized mixture of 90 to 95 mol percent of copper phthalocyanine pigment subject to said flocculation and 5 to 10 mol percent of copper phthalocyanine 4-mono sulfonic acid obtained by mixing 1.25 to 2.5 mol percent of a substance from the group consisting of 4-sulfo-phthalic acid and 4-sulfo-phthalic anhydride with 98.75 to 97.5 mol percent of phthalic anhydride and reacting said mixture at elevated temperatures with urea and cupric chloride until reaction is complete.

2. A process for the production of a phthalocyanine pigment highly resistant to flocculation which comprises mixing 0.5 to 3.75 mol percent of a substance from the group consisting of 4-sulfo-phthalic acid and 4-sulfo-phthalic anhydride with 96.25 to 99.5 mol percent of phthalic anhydride and reacting said mixture with urea and cupric chloride until reaction is complete to produce a copper phthalocyanine product containing between 5 and 10 mol percent of copper phthalocyanine 4-mono sulfonic acid.

3. A process for the production of a phthalocyanine pigment highly resistant to flocculation which comprises mixing 1.25 to 2.5 mol percent of a substance from the group consisting of 4-sulfo-phthalic acid and 4-sulfo-phthalic anhydride with 98.75 to 97.5 mol percent of phthalic anhydride and reacting said mixture at elevated temperature with urea and cupric chloride until reaction is complete to produce a copper phthalocyanine product containing between 5 and 10 mol percent of copper phthalocyanine 4-mono sulfonic acid isolating said copper phthalocyanine product and milling the same in the presence of an organic liquid which is non-corrosive with respect to the grinding elements and which is sufficiently volatile to permit its separation from the pigment by steam distillation.

4. A process for the production of a crystal stable phthalocyanine pigment highly resistant to flocculation which comprises mixing 1.25 to 2.5 mol percent of a substance from the group consisting of 4-sulfo-phthalic acid and 4-sulfo phthalic anhydride with from 16 to 20 mol percent of 4-chloro-phthalic acid and from 82.75 to 77.5 mol percent of phthalic anhydride and reacting said mixture at elevated temperature with urea and cupric chloride until reaction is complete to produce a copper phthalocyanine product containing between 5 and 10 mol percent of copper phthalocyanine 4-mono sulfonic acid, isolating said copper phthalocyanine product and milling the same in the presence of an organic liquid which is non-corrosive with respect to the grinding elements and which is sufficiently volatile to permit its separation from the pigment by steam distillation.

References Cited in the file of this patent

UNITED STATES PATENTS

| | | |
|---|---|---|
| 2,285,359 | Rosch et al. | June 2, 1942 |
| 2,526,345 | Giambalvo | Oct. 17, 1950 |

UNITED STATES PATENT OFFICE
CERTIFICATE OF CORRECTION

Patent No. 2,799,594                                July 16, 1957

Felix Frederick Ehrich

It is hereby certified that error appears in the printed specification of the above numbered patent requiring correction and that the said Letters Patent should read as corrected below.

Column 2, line 55, and column 3, line 36, for "Pthalic" read --Phthalic--; column 8, line 8, for "5 and 10" read --2 and 15--.

Signed and sealed this 27th day of August 1957.

(SEAL)
Attest:
KARL H. AXLINE
Attesting Officer

ROBERT C. WATSON
Commissioner of Patents